United States Patent
Jung et al.

(10) Patent No.: US 9,912,564 B2
(45) Date of Patent: Mar. 6, 2018

(54) METHODS AND SYSTEMS TO IDENTIFY BOTTLENECK CAUSES IN APPLICATIONS USING TEMPORAL BOTTLENECK POINT DETECTION

(71) Applicant: Xerox Corporation, Norwalk, CT (US)

(72) Inventors: Gueyoung Jung, Rochester, NY (US); Jinhui Yao, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 449 days.

(21) Appl. No.: 14/199,231

(22) Filed: Mar. 6, 2014

(65) Prior Publication Data
US 2015/0256434 A1 Sep. 10, 2015

(51) Int. Cl.
*G06F 15/173* (2006.01)
*H04L 12/26* (2006.01)
*H04L 29/08* (2006.01)
*H04L 12/24* (2006.01)

(52) U.S. Cl.
CPC ........ *H04L 43/0888* (2013.01); *H04L 41/142* (2013.01); *H04L 43/04* (2013.01); *H04L 43/0817* (2013.01); *H04L 67/02* (2013.01); *H04L 67/10* (2013.01); *H04L 67/22* (2013.01); *H04L 43/045* (2013.01)

(58) Field of Classification Search
CPC ............. G06F 11/3409; G06F 11/3419; G06F 11/3433; G06F 9/5083; G06F 2201/81; H04L 43/0888; H04L 67/1002
See application file for complete search history.

(56) References Cited

U.S. PATENT DOCUMENTS

| | | | | |
|---|---|---|---|---|
| 9,292,336 | B1* | 3/2016 | Ramalingam | G06F 9/541 |
| 2004/0059807 | A1* | 3/2004 | Klotz | H04L 41/0631 |
| | | | | 709/223 |
| 2005/0060619 | A1* | 3/2005 | Liberty | G06F 11/0769 |
| | | | | 714/55 |
| 2012/0215937 | A1* | 8/2012 | Myrah | G06F 13/4022 |
| | | | | 709/235 |
| 2013/0116976 | A1* | 5/2013 | Kanemasa | G06F 11/3452 |
| | | | | 702/186 |

FOREIGN PATENT DOCUMENTS

WO 2013072232 A1 5/2013

* cited by examiner

*Primary Examiner* — Shean Tokuta
(74) *Attorney, Agent, or Firm* — Fay Sharpe LLP

(57) ABSTRACT

Methods and systems are provided for determining performance characteristics of an application processing system. The method comprises monitoring throughput of a plurality of resources of the system in a selected time window. A change rate is detected in the throughput of the resources, respectively, representative of a change to constancy of workload in at least some of the resources. Such a change in constancy comprises a knee point of a plot of resource usage comprising load relative to throughput. The time of the change rate is identified within the time window. A relatively first to occur of a plurality of resources knee points is determined wherein the resource corresponding to the first to occur is determined to have a fully loaded throughput within the multi-tier processing system. The determination of the first to occur knee point comprises pinpointing a bottleneck starting point within the application processing system.

13 Claims, 4 Drawing Sheets

METHODS AND SYSTEMS TO IDENTIFY BOTTLENECK CAUSES IN APPLICATIONS USING TEMPORAL BOTTLENECK POINT DETECTION

TECHNICAL FIELD

The subject embodiments relate to diagnostic systems for monitoring application systems operation and identifying performance characteristics thereof. The embodiment is more particularly related to methods and systems to identify bottleneck causes of cloud-based multi-tier applications using temporal bottleneck point detection in application resources.

BACKGROUND

Detecting bottlenecks and identifying root causes of such bottlenecks are fundamental issues for system management. Automatically detecting application bottleneck points is a difficult problem in a large-scale and complex computing environment including cloud-based multi-tier applications. Typical cloud-based multi-tier applications include multiple software components (i.e., tiers) that are connected over inter- and/or intra-communication networks in data centers. Some components are serialized to process user requests step by step, and some components are configured to process user requests in parallel. For example, a web transaction application typically includes the front-end web server, the middle application server, and the back-end database server tiers. Each tier can be configured with multiple servers to process requests in parallel (e.g., database server cluster). In this situation, many system resources (e.g., CPU, memory, disk I/O, and network I/O) of distributed components of the multi-tier application can be used to handle user requests (e.g., web transactions). Precisely identifying bottleneck causes among such distributed resources is a burdensome and time consuming task. One attempted overall solution would be to monitor the application performance changes (e.g., application throughput) and then, to correlate system resource usages of all components into the application performance saturation for system diagnosis. It can be done by pinpointing a bottleneck starting point of the application performance and correlating it into bottleneck starting points of all system resources that are used for the application across tiers and servers.

However, automatically pinpointing and correlating bottleneck starting points is not trivial. It is very hard to unify some system resource usages (i.e., how much percentage disk I/O, system cache, or network bandwidth is used). Additionally, because there are usually some performance noises the pinpointing effort can get even harder. These noises can generate a number of false positives (e.g., false alarms) and consume some costs to resolve such false positives. The noise gets severe once the application reaches around a bottleneck point, and it makes the problem (i.e., pinpointing the bottleneck starting point) even more difficult. Meanwhile, missing the application bottleneck for a long time interval can lead to a false negative that leads to losing the chance to diagnose system behaviors and then, resolve the real application bottleneck.

Thus, there is a need for better methods and systems to automatically detect bottleneck points in application resources for identifying bottleneck causes in cloud-based multi-tier applications for system diagnosis.

BRIEF DESCRIPTION (SUMMARY)

According to aspects illustrated herein, there are provided methods and systems for determining performance characteristics of an application processing system. The method comprises monitoring throughput of a plurality of resources of the system in a selected time window. A change rate is detected in the throughput of the resources, respectively, representative of a change to constancy of processed workload in at least some of the resources. Such a change in constancy comprises a knee point of a plot of resource usage comprising throughput relative to load. The time of the change rate is identified within the time window. A relatively first to occur knee point is determined wherein the resource corresponding to such first to occur is determined to have the first fully loaded throughput within the multi-tier processing system. The determination of a first to occur knee point comprises pinpointing the bottleneck starting point within the application processing system.

According to an alternative aspect disclosed herein, a processing system is provided for identifying bottleneck causes in cloud-based multi-tier applications. The system includes a communication network including a non-transitory storage medium for storing and processing instructions readable and executable by an electronic data processing device. Also included is a plurality of application tiers for data processing transactions within the network, each tier including system resources; and, a processor for monitoring system resource logs within a predetermined time window for identifying a knee point of resource throughput representative of a bottleneck in system resource operation, and for determining a first-in-time occurrence of the bottleneck within the window. The resource associated with the first-in-time occurrence is identified as the system bottleneck cause.

DETAILED DESCRIPTION

By way of introduction, the subject embodiments describe a diagnostic method and system to automatically detect bottleneck points and identify bottleneck causes in cloud-based multi-tier applications. A multi-tier application, in which the tiers are connected like a chain, is a very popular software deployment in modern cloud infrastructure. A bottleneck in one of the tiers will trigger bottleneck patterns (i.e., it shows a pattern to be bottlenecked, but might not be an actual bottleneck) in other tiers and eventually an overall system bottleneck results. On one hand, once a front-end tier's resource reaches its capacity (i.e., bottlenecked), it is no longer able to forward more of its output to the following back-end tiers so that these back-end tiers do not use their full resources, even though they have enough resources for more capacity. On the other hand, when a back-end tier is not able to process more inputs because it is bottlenecked, the front-end tiers will have to accumulate loads that cannot be forwarded to the back-end tier and they will also eventually show bottleneck patterns. Therefore, determining the initial bottleneck cause is to reveal the weakest link of the chain so guidance can be offered as which tier should be re-enforced in order to improve the overall performance.

Basically, for a given application deployment, the workload of the application is analyzed in the context of its resource usage patterns that are collected from an online monitoring system in the cloud and then, bottleneck points can be automatically computed of all resources to temporally correlate these bottleneck points into the bottleneck point of the application throughput. The bottleneck point can be described as a knee point of a resource usage curve (and application throughput curve as well), while load to the tier increases. Typically, the change rate of a resource usage (i.e., slope) increases rapidly if the load is low, but change rate gets lower over time and eventually near zero (i.e., getting flat) once the resource capacity is fully used up for a large amount of load (i.e., throughput is essentially steady). The subject embodiments automatically identify these bottleneck starting points (i.e., "knee points"), and compare the timestamps of the bottleneck starting points of all resources in a certain measurement granularity (i.e., measurement interval). Note that bottleneck points can occur in many resources not because they are actually bottlenecked, but that they are just shown as bottleneck patterns because of some other real bottleneck causes. The embodiments practically narrow down the possible candidates of bottleneck causes and then, locate the root cause of the application bottleneck.

Figure 1:
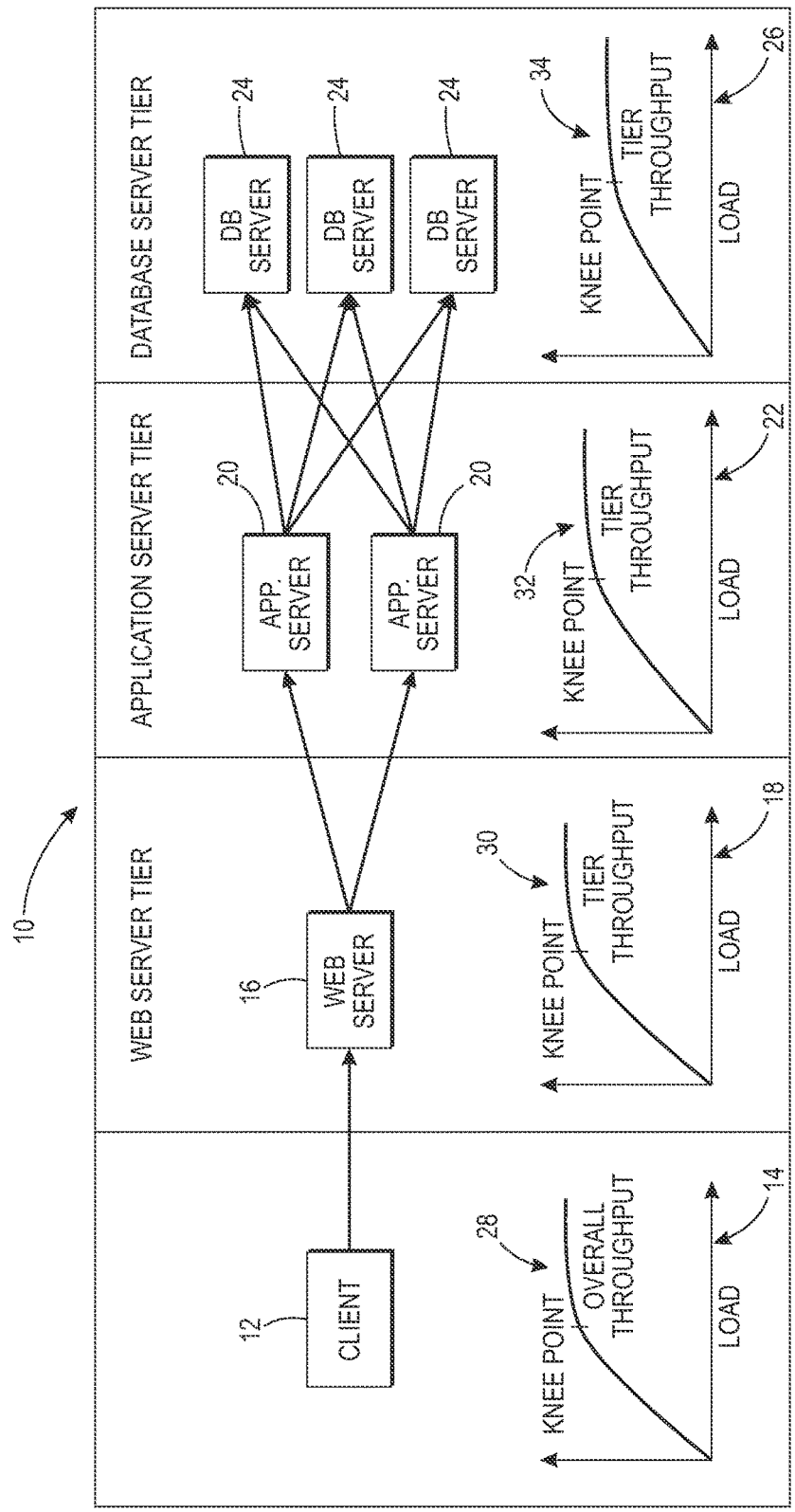
FIG. 1 is a representation of multi-tier web transaction application including graphical indications of bottleneck tier.

With reference to FIG. 1, a multi-tier web transaction application 10 is shown comprising a client 12 that sends user requests to the multi-tier web transaction application; a front-end web server 16, middle application servers 20 and back end data-base servers 24. Each tier can comprise multiple servers as is common in cloud-based multi-tier applications. More particularly, the disclosed data processing systems comprise a communication network wherein the servers may be a cloud-based server implemented by a network of computers (or, more generally, electronic data processing devices including a non-transitory storage medium for storing and processing instructions readable and executable by an electronic data processing device) operatively interconnected via a local area network (LAN, wired and/or wireless), the Internet, or so forth (i.e., the servers may be a distributed server). In some such configurations, computers and/or processing time on individual computers may be allocated to or de-allocated from a server automatically on an ad hoc basis to accommodate changes in server load. Individual applications executed on the server, and its processing, may be variously allocated amongst the computers making up the (distributed) server. Thus, the cloud-based multi-tier application includes multiple software components (i.e., tiers 16, 20, 24) that are connected over inter- and/or intra-communication networks. The tiers can be connected like a chain and then user requests are handled in each tier step-by-step through all tiers. Each tier can be configured with multiple servers to process requests in parallel.

With more particular reference to FIG. 1, four applicable representations 14, 18, 22, 26 of throughput relative to load are associatively shown for the client 12 and each tier 16, 20, 24. A bottleneck pattern of the application throughput is illustrated as a knee point (i.e., bottleneck point) 28, 30, 32, 34 in the throughput graphical representations 14, 18, 22, 26, respectively. It can be seen that the knee points 28, 30, 32, 34 are a representation in a client/server throughput plot curve comprising a noticeable rate change in throughput indicative of operational resource capacity, as the load to the application increases. After the knee points, the application throughput essentially cannot increase further, while there is seen a rapid increase before the knee point. The knee point is thus a representation of system bottlenecking occurring because at least some of the system resources of the tiers can no longer functionally increase throughput. An operational capacity has occurred in that resource so that further increase in the workload fails to cause an increase in throughput. A bottleneck in one of the tiers will eventually trigger bottleneck patterns in the others. For example, if the front end webserver tier 16 is bottlenecked, the rest of the following tiers 20, 24, will show the bottleneck patterns shown in the throughput plots 22, 26 although the servers 20, 24 may not actually be bottlenecked (i.e., they still have enough resources to handle requests). All tiers show the bottleneck patterns because the bottlenecked tier cannot push requests into the next tiers. Alternatively, if a back end data based server 24 is bottlenecked, the prior tiers 12, 16, 20 cannot push requests into the data base tier, but the requests are accumulated in these tiers. Due to such actual system behaviors, the bottleneck patterns 14, 18, 22, can be shown in the prior tiers as well although they are not actually bottlenecked.

In the subject diagnostic analysis, while all knee points 28, 30, 32, 34 are captured first, to identify the starting points of bottleneck patterns in the servers, and thus the points for all tiers and resource usages of each tier. The diagnostic then identifies the bottleneck causes, in the context of system resources, by analyzing the temporal relations among the bottleneck patterns of all tiers and resource usages. Additional specificity can be acquired by narrowing down the bottleneck tier analysis by identifying the earliest knee point among the knee points found in all tiers. Further narrowing down the bottleneck causes in a tier is realized by identifying the earliest knee point among the knee points found in all resource usage patterns therein.

Figure 2:
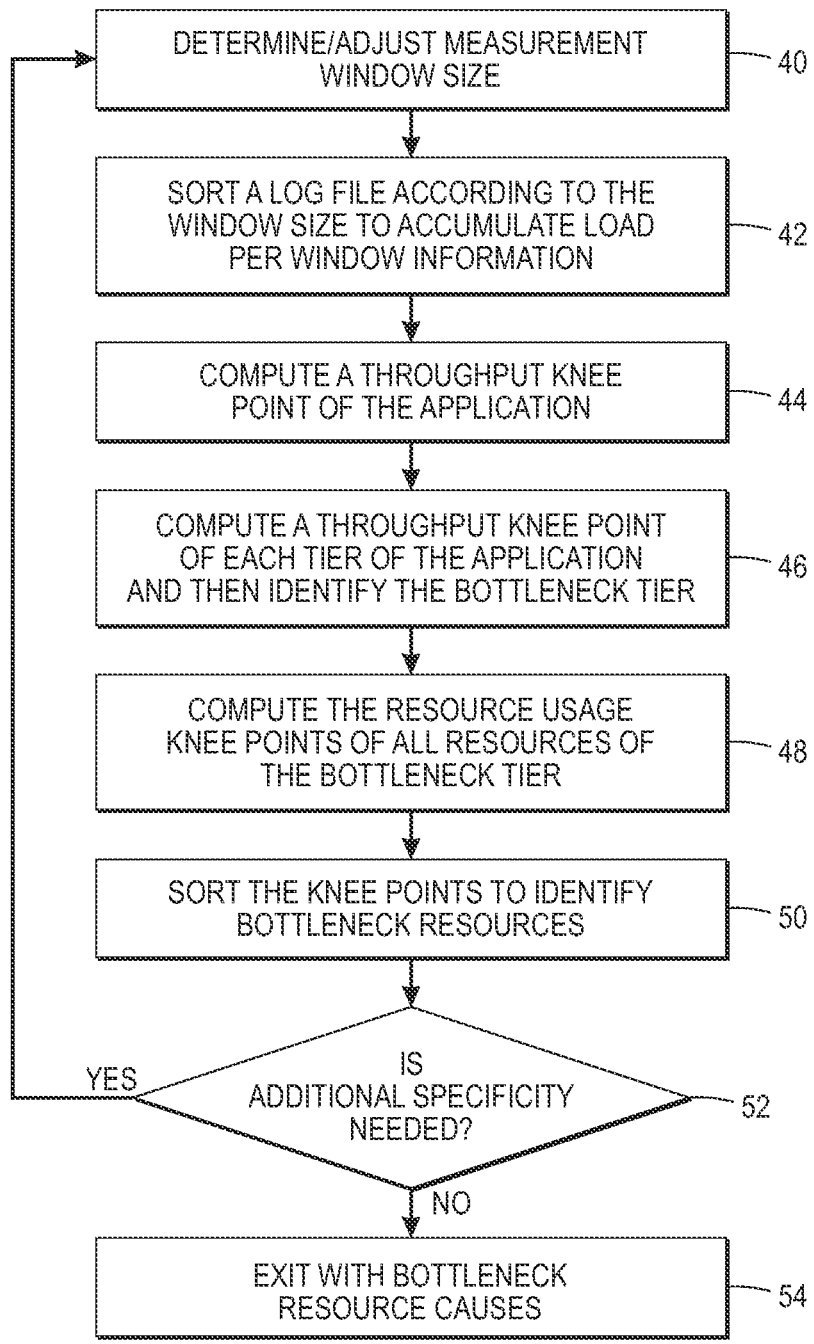
FIG. 2 is a flow chart of an exemplary diagnostic method.
Figure 3:
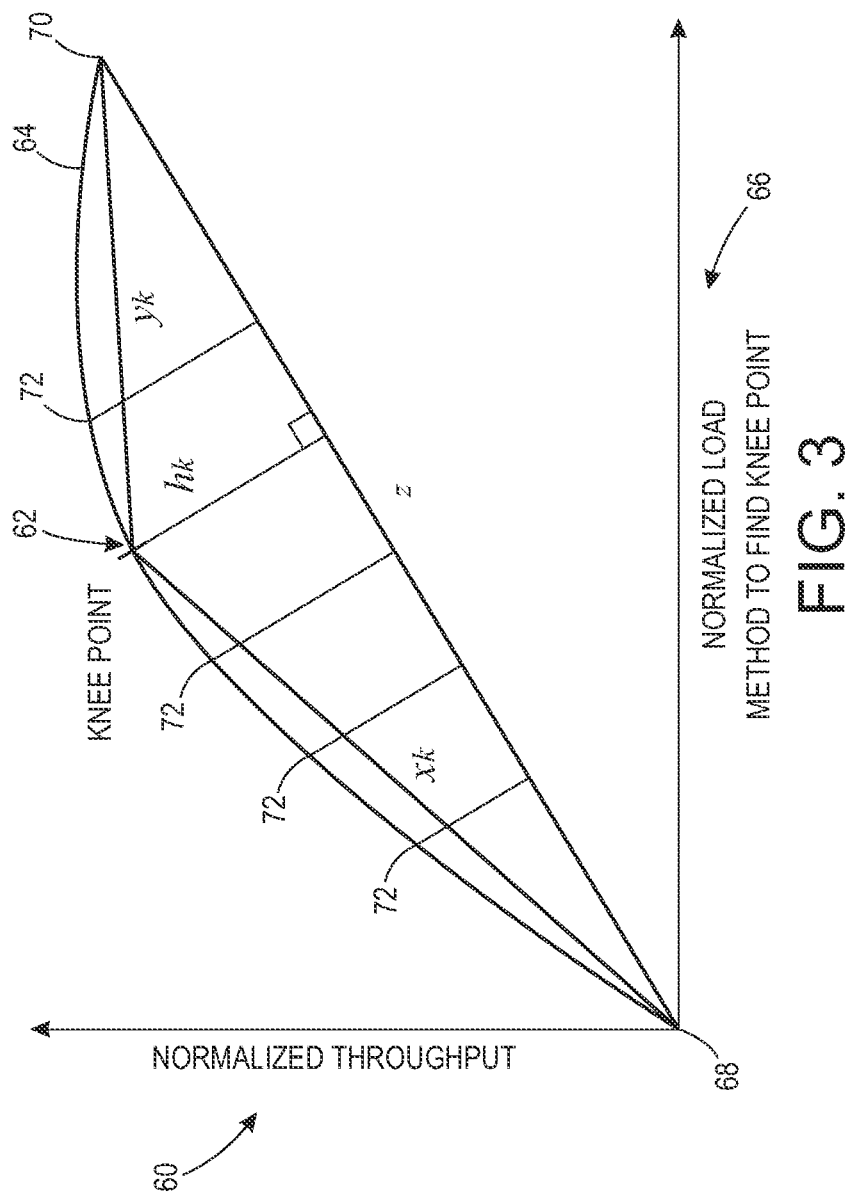
FIG. 3 is a graphical representation of resource throughput relative to load including illustrative aspects for algorithmic identification of a bottleneck point of the throughput.
Figure 4:
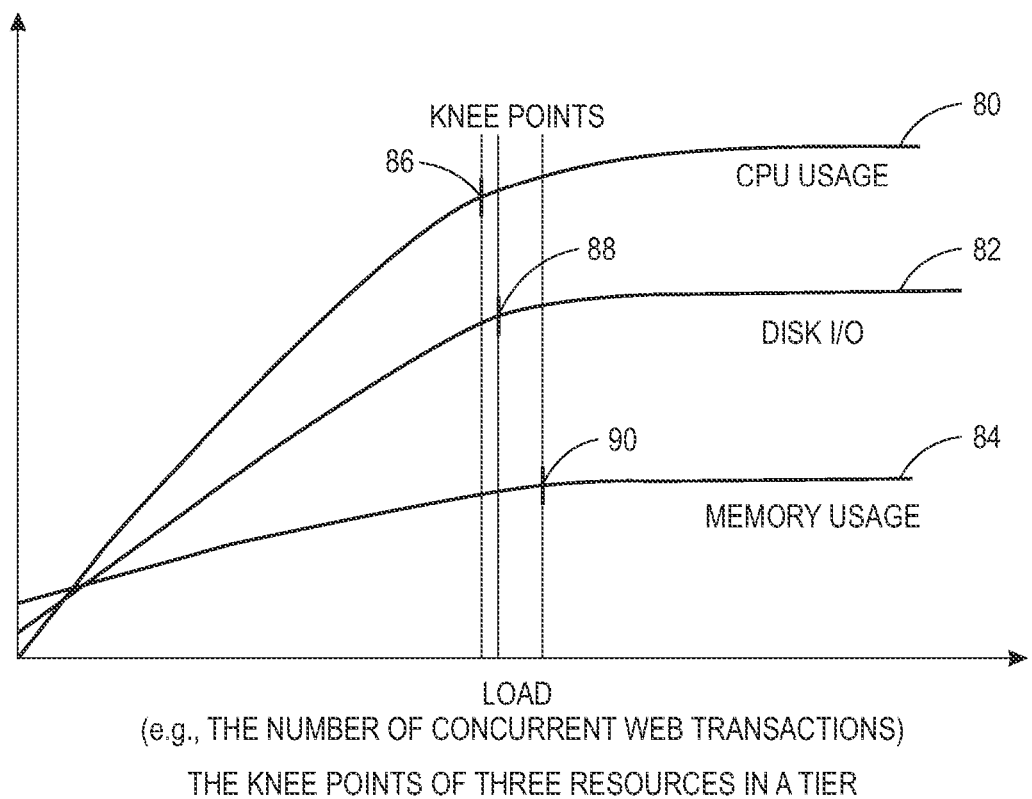
FIG. 4 is a graphical representation of a plurality of distinct resource bottleneck points with respect to occurrence in a time window.

With particular reference to FIGS. 2-4 embodiments of a diagnostic method for determining performance characteristics of a processing system for identifying bottleneck causes using temporal bottleneck point detection is more particularly illustrated. The system diagnosis includes measuring the throughput and resource usages over a series of measurement windows (i.e., at measurement intervals) then computing statistics for tier and resource operations such as average (i.e., the average CPU usage) and count (e.g., the number of requests handled) if there are multiple measure points in each measurement window. Data monitors (not shown) can capture the measurement with various granularities (e.g., per second, per minute, etc.). Monitors (not shown) which capture throughput and resource usages, are located in each server 12, 16, 20, and 24. All such log data is collected by the data monitor which then compute the bottleneck patterns, knee points, and causes. A user can manually trigger the computation, or the system can trigger it automatically and then, send alerts to users. During a runtime of the system, the resource usages and throughput of each tier often fluctuate and this fluctuation will introduce some noise in the identifying of overall system trends. The selection of the measurement window size directly determines the degree of fluctuation and then the granularity of identifying bottleneck causes. For a small measurement window, one will expect more precisely sorted knee points but with a finer time interval to pinpoint the bottleneck tier and resource, it will have more fluctuations in the observations. Meanwhile, with a larger measurement window, one will expect less fluctuation in the observations by smoothing the plotted curve, but may see that more knee points of different tiers and resources are captured in the same window when sorting. The purpose of selectively determining a measurement window size is to determine how precisely system diagnostics identifies the bottleneck causes (i.e., how much one can narrow down the bottleneck causes). Thus it is often best to start with a relatively large window size and then, after an integration of the diagnostic process, the subject system can narrow down the bottleneck causes by adjusting for the window sizes.

The overall approach method involves 1) determine/adjust measurement window size (i.e., measurement interval) 40; 2) sort the system log file 42, which is generated by system monitors with timestamps, according to the windows size to capture the load increase and throughput; 3) determine 44 that this application has an overall bottleneck; 4) identify 46 the throughput bottleneck point of each tier by computing the knee point in the throughput curve; 5) identify 48 resource usage bottleneck points for each resource; and 6) identify the bottleneck causes by temporal sorting 50 all the bottleneck points of all resources. The method captures the earliest bottleneck starting points as the bottleneck causes. After one iteration, if the number of possible bottleneck candidates is still large due to the measurement granularity, the process goes back to the window adjustment step 52 to adjust 40 the measurement window size and proceed through iteration. When no further iterations are prudent, the method has then determined the resource causing the bottleneck.

The foregoing processes and embodied systems will be described with more particularity as follows:

The subject embodiments measure the throughput and resource usages over a series of measurement windows (i.e., measurement intervals), and then, computes statistics such as average (e.g., the average CP usage) and count (the number of request handle) if there are multiple measurement points in each window. The diagnostic monitors capture the throughput measurements with various granularities (e.g., per second, per minute, etc.). During the run time of the system, the resource usages and throughput of each tier often fluctuate and this fluctuation will introduce some noises in the identifying of the overall trends. The selection 40 of the measurement window size directly determines the degree of fluctuation and then the granularity of identifying bottleneck causes. For a smaller measurement window, one will expect more precisely sorting the knee points with a finer time interval to pinpoint the bottleneck tier and resource, but will have more fluctuations in the observations. With a larger measurement window, one will expect less fluctuation in the observations by smoothing the curve, but may see that more knee points of different tiers and resources are captured in the same window when sorting. The purpose of determining and adjusting 40 measurement window size is to determine how precisely the subject embodiments identify candidate bottleneck causes (i.e., how much the adjustment can narrow down the identified bottleneck causes). In practice, the subject diagnostic methods would start with a relatively large window size and then, after a first iteration of the process, the system can determine if additional specificity is needed 52. If so, the system can then narrow down the bottleneck causes by adjusting 40 the window size.

With regard to sorting 42 the log file, the monitoring logs of different resource components of the application are stored either centrally (i.e., stored in a central archive (not shown)) or locally (i.e., stored in some archive on the specific server). In order to capture the bottleneck patterns of the throughputs and resource usages of all tiers, all of this log data needs to be accessed in the log entries aggregated according to the window size determined in a step 40. It is envisioned that there are many ways that the entries can be aggregated according to the window size. One simple way to do so is to apply a moving average to the log entries. For instance, given the throughput of a component that is measured every second and stored in the log, a window size of a minute would require applying a moving average of 60 entries to the logs. Computing a knee point 28 of the overall throughput of the application is appropriate to first confirm that the application has a bottleneck. The application throughput can be defined as a number of requests that successfully get through all tiers 16, 20, 24 or it can be defined as a number of requests that are successfully returned from the front-end tier 16 after being executed across all the other tiers 20, 24. Under normal circumstances, the throughput (see plot 14) of the application will keep increasing as the load increases until a certain point, after that point, the throughput cannot increase further because the system bottleneck occurs. This is the throughput knee point indicating the capacity of the application where the throughput reaches a constancy regardless of the increase in the load. When the load exceeds its capacity, the performance of the application will start to downgrade and eventually deteriorate.

FIG. 3 illustrates the bottleneck plot of the throughput 60 and shows a method to find the knee point 62 of the throughput curve 64. FIG. 3 shows a plot of normalized load 66 against normalized throughput 60 of the application under diagnosis. A linear line connects a first measurement point 68 to the last point 70 and then it computes its length (i.e., z in FIG. 3). At each of the plurality of measurement points 72 according to the selected window size and averaging therein, the length of the orthogonal line drawn from the linear line z to the measurement point 72, for example, for knee point 62 (which is one of the measurement points 72) the height $h_k$ in FIG. 3 is the computed, where k is considered each measuring point for the algorithm discussed below. To compute the height of each measurement point 72, a diagnostic algorithm generates two lines ($x_k$ and $y_k$ in FIG. 3) and computes their lengths. The first line $x_k$ is drawn from the first measurement point 68 to the current measurement point 72 and the second line is drawn from the current measurement point 72 to the last point 70. Then using cosine rule and sine rule, the height $h_k$ is computed in accordance with the following equation.

$$h_k = x_k \sin(\cos^{-1}((x_k^2 = z^2 - y_k^2)/2x_k z))$$

The knee point 62 is the point that has the highest height $h_k$ from the linear line Z among all measurement 72. End of this knee point 62 indicates the capacity of the application under diagnosis. Such a knee point is shown in FIG. 1 as a knee point 28 in plot 14 for the client 12.

Computing throughput knee points 30, 32, 34 of the application tiers 16, 20, 24 respectively is accomplished using the same methods used in step 44 and has the effect of narrowing down the focus of the diagnostic search to each bottleneck tier, respectively. The throughput of each tier 16, 20, or 24 can be defined as a numbered request that successfully gets through the tier and then, arrives at the queue of the next tier to be processed. The bottleneck tier then will be one that has the earliest knee point among all knee points of all tiers.

The tier that has been determined to have the earliest knee point has a plurality of resources. The subject diagnostic methods and systems also capture the resource usages of all system resources such as CPU, memory, disc I/O, and network I/O while load increases. Similar with the bottleneck pattern diagnostic of throughput, the resource usage also increases while the resource has capacity enough to handle a given load. However, once the resource does not have enough capacity to handle an amount of load, then it starts to slowly increase and then, eventually flatten out. The same diagnostic algorithmic method discussed above for computing knee points in steps 44 and 46 is employed in step 48 to compute the knee point of each resource.

FIG. 4 shows exemplary resource usage patterns for CPU usage 80, disc I/O 82 and memory usage 84, and are only shown as representative resources as the subject diagnostic methods are applicable to all resources of any particular tier, as will be readily appreciated to one of ordinary skill in the art. As the load to these resources increases over time, it can be seen that knee points can be computed on the throughput plots and it should be noted that the knee points are relatively different among the resources 80, 82, 84. Similar with the step 46, one bottleneck resource, CPU usage 80 has the earliest knee point 86 of all the knee points 88, 90 of all other resources 82, 84 in FIG. 4. The system assumes that load increases over the time. Thus, the earliest knee point 86 means that it is the knee point that happened at the lowest load level. FIG. 4 indicates that CPU usage contributes more to the workload throughput than memory and disc I/O by being consumed faster (i.e., its change rate or slope of the curve is higher) than memory and disc I/O. Meanwhile, the figure also indicates that once the CPU reaches its full capacity (i.e., bottlenecked at knee point 86) it thereafter affects the throughput usages of memory and disc I/O. For example, although memory may have enough capacity to handle the current load, the application system cannot use the memory because CPU is bottlenecked (i.e., the queue of memory will eventually be empty since CPU is bottlenecked).

It is worth noting that one may not be able to unify different resources to the same usage percentage forms for calculations. For example, many system monitoring tools such as "PS" (Process Status) and "SAR" (System Activity Report) show the CPU and memory usage as percentages. However, this is not the case for other resources, such as disc I/O and network I/O. The subject embodiments provide an effective method for observing the resource usage patterns as change rates (i.e., slopes) of resource usages, and computing the knee points from such change rates, disregarding the units used to measure their particular resource usages. Accordingly, the subject methods and systems can be used for any type of resource and monitoring tools.

Once the knee points of the different resources of a bottleneck tier have been found, the subject diagnostic system sorts 50 them according to the time-stamps of their respective occurrences. As noted above, the log file includes time stamps of throughput measurements. Intuitively, the knee point happening first is most likely to be the bottleneck of the entire system application. On one hand, since the resource has reached its capacity, it is no longer able to forward more output to the following resource; on the other hand, as it is not able to process more imports, the resources prior to it will have to accumulate loads that cannot be forwarded to the next resource and eventually reach their own knee points.

Lastly, the subject diagnostic system decides whether it will further narrow down the window including the bottleneck causes or not. Alternatively, the decision to acquire additional specificity can be done by a user after he/she sees a listing of current bottleneck causes. With a large window size, the subject system returns multiple bottleneck causes. In the example shown in FIG. 4, it can be seen that the CPU 80 and disc I/O 82 obviously reached their knee points prior to the memory 84, but CPU and disc I/O reach their knee points almost at the same time and thereby, the diagnostics system will show that the CPU and disc I/O are the possible bottleneck causes. In this case, the diagnostic system will narrow down the analysis by adjusting the window size to a smaller one and can thereby more confidently determine that the CPU resource 80 is the bottleneck cause.

The foregoing embodiments of a diagnostic method and system can automatically compute the bottleneck starting point on throughput and resource usage patterns. It does not need to unify resource usages to compute the bottleneck starting point because it uses a change rate of resource usage.

Further, the subject diagnostic systems can automatically identify bottleneck causes using a temporal correlation of bottleneck starting points collected by monitoring a large scale multi-tier application.

Further, the subject methods and systems can systematically identify bottleneck causes by adjusting a measurement interval (or window size) over iterations to narrow down the scope of bottleneck causes.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for determining performance characteristics of a processing system while minimizing data representation of system resource usages, comprising:
   monitoring throughput of a plurality of resources of the system in a selected time window;
   detecting, for each resource, a knee point in the throughput of the resources occurring prior to a fully loaded throughput, respectively, representative of a first noticeable rate change in throughput to constancy of workload after which throughput essentially cannot increase further in at least some of the resources;
   identifying, for each resource, a time of the knee point detecting within the time window;
   sorting the knee points of the plurality of resources according to the identified time of the knee point detecting;
   and,
   determining a relatively first to occur of the a plurality of sorted knee points of the plurality of resources wherein the resource corresponding to the first to occur identified time is determined to indicate a first fully loaded throughput within the processing system;
   wherein the relatively first to occur knee point is a first to occur knee point in the selected time window;
   wherein the first to occur knee point is a bottleneck starting point comprising the approaching a flat change rate in a resource usage curve representative of the throughput within the processing system; and
   wherein the time window is selectively adjusted for iterating the detecting of knee points in smaller ones of selected time windows when possible bottleneck causes are large due to measurement granularity and reducing a number of possible first bottleneck starting points.

2. The method of claim 1 wherein the monitoring throughput comprises measuring resource usage by plotting of load relative to throughput.

3. The method of claim 2 wherein the plotting includes generating a throughput curve.

4. The method of claim 1 wherein the monitoring throughput comprises monitoring a cloud-based multi-tier application system.

5. A method to identify bottleneck causes in a processing system using temporal bottleneck point detection, including:
   setting a measurement interval for monitoring throughput of the system;
   monitoring throughput of a plurality of resources of the system in the measurement interval;
   detecting, for each resource, a knee point in the throughput of the resource;
   identifying, for each resource, a timestamp of the detected knee point within the measurement interval;
   sorting a system log file including the timestamps associated with the detected knee point in throughput occurring prior to a fully loaded throughput wherein the knee point comprises a first noticeable rate change in throughput to constancy of workload after which throughput essentially cannot increase further;
   using the timestamps to determine an earliest throughput knee point; and
   identifying the resource having the earliest throughput knee point as the bottleneck cause comprising approaching a flat change rate in a resource usage curve representative of the throughput within the processing system;
   wherein the measurement interval is selectively adjusted for iterating the detecting of knee points in smaller ones of measurement intervals when possible bottleneck causes are large due to measurement granularity and reducing a number of possible first bottleneck starting points.

6. The method of claim 5 wherein the identifying the knee points in the resources includes determining an initial rate change in a plot of throughput versus load for the resources.

7. The method of claim 5 wherein the identifying the plurality of throughput knee points includes selectively narrowing down the throughput monitoring from overall system throughput, to system tier throughput, to the resources of the tier.

8. A data processing system for identifying bottleneck causes in cloud-based multi-tier applications, the system including:
   a communication network including a non-transitory storage medium for storing and processing instructions readable and executable by an electronic data processing device;
   a plurality of application tiers for data processing transactions within the network, each tier including system resources; and
   a processor for monitoring system resource logs corresponding to monitored throughput of system resources within a predetermined time window, for identifying, for each system resource, a knee point of system resource throughput representative of an initial rate change in throughput to constancy of workload in system resource operation after which throughout essentially cannot increase further comprising a change rate in throughput occurring prior to a fully loaded throughput, identifying, for each resource, a time of the knee point identifying, sorting the knee points of the plurality of resources according to the identified time and for determining a first in time occurrence of the knee point within the window, wherein the system resource associated with the first-in-time occurrence is identified as the system bottleneck cause comprising approaching a flat change rate in a resource usage curve representative of the throughput within the processing system; and
   wherein the processor selectively adjusts the time window for iterating the identifying of knee points in smaller ones of time windows when possible bottleneck causes are large due to measurement granularity and reducing a number of possible bottleneck candidates.

9. The system of claim 8 wherein the plurality of application tiers includes a web server tier, an application server tier and a database server tier.

10. The system of claim 9 wherein the processor sequentially monitors the web server tier, the application server tier and the database server tier for identifying knee points in tier throughput comprising the system bottlenecks.

11. The system of claim 10 wherein the processor computes a plot of tier throughput for identifying the knee point.

12. The system of claim 11 wherein the knee point comprises a first noticeable rate change of throughput increase in response to increased tier load.

13. The system of claim 8 wherein the processor determining of the first-in-time occurrence of the knee point includes comparing time stamps of knee points of the system resources.

* * * * *